Oct. 8, 1968
C. M. KRUTCHEN ETAL
3,404,433
EXTRUSION COATING EQUIPMENT
Filed Sept. 27, 1966
2 Sheets-Sheet 1
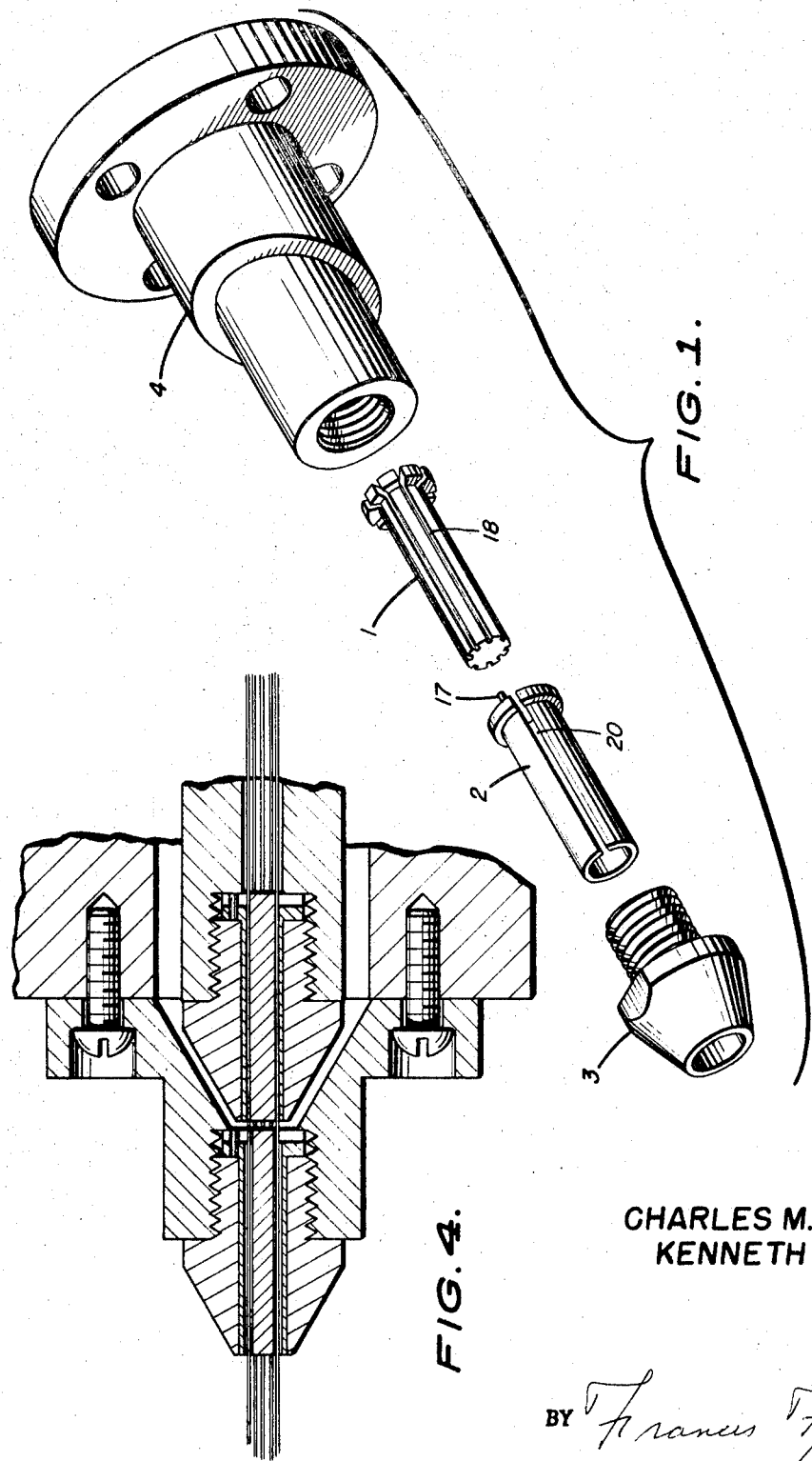
CHARLES M. KRUTCHEN
KENNETH E. SHEETS
INVENTORS
BY *Francis H. Weif*
ATTORNEY Oct. 8, 1968     C. M. KRUTCHEN ETAL     3,404,433
EXTRUSION COATING EQUIPMENT
Filed Sept. 27, 1966     2 Sheets-Sheet 2
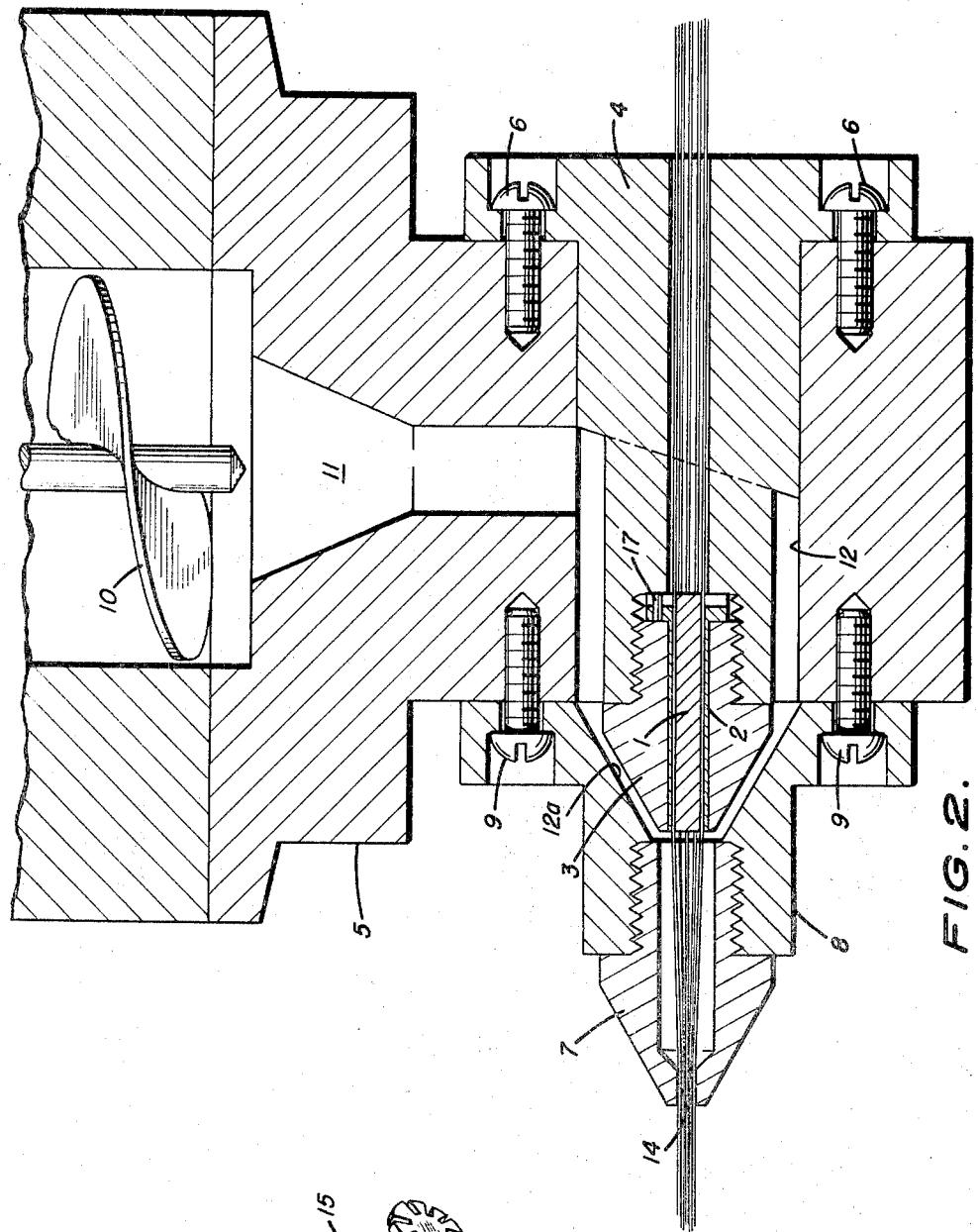
CHARLES M. KRUTCHEN
KENNETH E. SHEETS
  INVENTORS
BY *Francis H. Derf*
   ATTORNEY

3,404,433
EXTRUSION COATING EQUIPMENT
Charles M. Krutchen and Kenneth E. Sheets, Ellicott City, Md., assignors to W. R. Grace & Co., New York, N.Y., a corporation of Connecticut
Filed Sept. 27, 1966, Ser. No. 582,371
4 Claims. (Cl. 18—13)

ABSTRACT OF THE DISCLOSURE

The present invention concerns a crosshead for extrusion coating a plurality of filamentary structures which comprises an inlet for the filamentary structures, an outlet for the filamentary structures and a plastic supply located between said inlet and said outlet, the said inlet and the said outlet each comprising a generally cylindrical mandrel, an outer sleeve for said mandrel, an outer housing for said sleeve and a means for securing the mandrel and sleeve within the said housing, the said mandrel containing a plurality of longitudinal grooves on its outer periphery which extends the length of the mandrel and the said sleeve containing a slot which extends the length of the sleeve. The present invention also provides a guider tip for such an extrusion apparatus.

---

The present invention relates to a novel and useful guider tip and a crosshead employing at least one of said guider tips. More particularly, it relates to a guider tip for coating filamentary structures and a crosshead utilizing the guider tip.

It is known in the art that various filamentary structures such as wires, textile filaments and the like may be coated with plastic or plastic foams. For example, it is common to coat wires with various plastics so that the wires may be utilized in underground connections. Recently, a process has been developed for coating continuous plastic fibers with foams so that the resulting products may be utilized as a baler twine or the like. In a still more recent development, a foam/fiber composite is made in which the fibers encircle a foamed interior core. When producing such a product, it is essential that the fibers be maintained in spaced relationship so that the foam will penetrate to the interior of the core. The present guider tip and crosshead is particularly adapted to hold the filaments in spaced relationship so that the fibers will be on the periphery of the resulting composite which composite is particularly suited for use as a substitute for baler twine or other types of tying cords.

It is an object of the present invention to provide a guider tip for holding filaments in spaced relationship during extrusion coating. A further object is to provide a crosshead for extrusion equipment utilizing the guider tip. A still further object is to provide a crosshead which is suitable for forming a foam/fiber composite. Another object is to provide a crosshead in which a plurality of filamentary structures may be simultaneously coated. Other objects will become apparent as the description of the invention proceeds.

These objects are accomplished by the present invention which provides a guider tip for holding a plurality of filamentary structures in spaced relationship which comprises a mandrel, an outer housing and a means for securing the mandrel within the said housing, the said mandrel containing a plurality of longitudinal grooves on its outer periphery which grooves extend at least the length that the outer housing is in contact with the mandrel.

In a preferred embodiment of the present invention, the mandrel is generally cylindrical and it contains an outer sleeve having a slot which extends the length of the sleeve.

The present invention also provides a crosshead for extrusion coating a plurality of filamentary structures which comprises an inlet for the filamentary structures, an outlet for the filamentary structures and a plastic supply located between said inlet and said outlet, the said inlet and the said outlet each comprising a generally cylindrical mandrel, an outer sleeve for said mandrel, an outer housing for said sleeve and a means for securing the mandrel and sleeve within the said housing, the said mandrel containing a plurality of longitudinal grooves on its outer periphery which extend the length of the mandrel and the said sleeve containing a slot which extends the length of the sleeve.

In another embodiment of the present invention the crosshead contains the above described guider tip at the inlet portion of the crosshead and a one hole extrusion orifice at the outlet of the crosshead.

The term "crosshead" is used in its conventional sense to mean the exit end of the extruder. The expression "filamentary structure" is used to signify any shaped structure which has one dimension which is small as compared to its other two dimensions. It includes ribbons, monofilaments, multifilaments and the like regardless of whether they are composed of metal, plastic or any other such material. The "crosshead" is used to coat the "filamentary structure" by the conventional "extrusion coating" technique whereby the plastic is forced from an orifice around the filamentary structure so that the filament is uniformly coated with the plastic.

The invention will now be described by reference to the drawings:

FIGURE 1 is an exploded perspective view of a preferred guider tip of the present invention shown with the guider tip holder;

FIGURE 2 is a cross sectional view of the crosshead of the present invention shown in conjunction with the end of the extruder;

FIGURE 3 is a perspective view of another guider tip of the present invention; and FIGURE 4 is a partial view of another crosshead of the present invention.

In FIGURES 1 and 2 the guider tip comprises a cylindrical mandrel 1 containing grooves 18 and an outer sleeve 2 for the mandrel 1 and an outer housing 3 for the sleeve 2. As shown, the cylindrical mandrel 1 fits within the outer sleeve 2 which in turn fits within the outer housing 3. The outer housing 3 is threaded so that the guider tip may be screwed into the guider tip holder 4. As shown in FIGURE 2, the guider tip containing elements 1, 2 and 3 and guider tip holder 4 are secured into extruder housing 5 by means of bolts 6. The extrusion nozzle 7 in the forward end of the extruder housing 5 is screwed into a nozzle housing 8 which is positioned directly in front of the guider tip and is connected to the extruder housing by means of bolts 9. A screw 10 in the extruder forces plastic from the barrel of the extruder into the plastic supply chamber 11 and then into the crosshead chamber 12. A plurality of filaments are led through the guider tip elements 1, 2 and 3 so the filaments are maintained in spaced relationship as they pass through the forward part of the crosshead chamber 12a. At the orifice 14 of the extrusion nozzle 7 the plastic surrounding the bundle of filaments is cooled so as to solidify the filament/plastic composite into a single strand.

FIGURE 3 shows a guider tip which represents another embodiment of the present invention. In FIGURE 3 the guider tip consists of only two elements. The cylindrical mandrel 15 containing grooves 19 is shown partially inserted into the outer housing 16. The guider tip is very similar to that shown in FIGURES 1 and 2 with the exception that the outer sleeve 2 for the mandrel 1 is omitted from this embodiment.

In utilizing the guider tip shown in FIGURE 3, the filaments are inserted through the outer housing 16 and are then positioned in the various grooves 19 of the cylindrical mandrel 15. In the guider tip shown in FIGURES 1 and 2, the positioning of the filaments in the grooves 18 are made much easier by the use of the outer sleeve 2 containing a slot 20. In this embodiment, the outer sleeve 2 is positioned on the cylindrical mandrel 1 and the filaments are merely placed in the slot 20 which positions them in the grooves 18. As each filament is positioned, the sleeve is turned so as to be aligned with the next groove. A projection 17 on the outer sleeve 2 positions the sleeve on the mandrel after the insertion of all of the filaments into the groove. After the proper positioning of the filaments, the cylindrical mandrel 1 containing the outer sleeve 2 is merely inserted into the outer housing 3. In this way a positive positioning of the filament occurs prior to the insertion of the mandrel in the outer housing. In FIGURE 3 the filaments must be manually held until the cylindrical mandrel 15 is inserted into the outer housing 17. While a cylindrical mandrel is preferred, it is obvious that in the embodiment shown in FIGURE 3 a square, rectangular, oval or any other shaped mandrel may be utilized with a correspondingly shaped outer housing.

FIGURE 4 is essentially the same as FIGURE 2 with the exception that the guider tip shown in FIGURE 1 is utilized as the guider tip and as the extrusion orifice for the crosshead. Thus, the filaments emerging from the crosshead shown in FIGURE 4 are merely coated rather than formed into a single composite filament as is formed in FIGURE 2. This is accomplished by maintaining the filaments in spaced relationship at the extrusion orifice of the extruder. The various parts of the extrusion orifices of FIGURE 4, therefore, are the same as shown in FIGURE 1.

The apparatus of the present invention can be utilized in any of the conventional extrusion coating procedures. For example, the apparatus may be used to coat a plurality of wires from a single crosshead. In addition, the apparatus may be utilized for feeding a plurality of filaments through a crosshead so as to form a composite filament containing fibers and a plastic or foam exterior.

Many equivalent modifications will become apparent to those skilled in the art from a reading of the foregoing without a departure from the inventive concept.

What is claimed is:

1. A guider tip for holding a plurality of filamentary structures in spaced relationship which comprises a mandrel, an outer housing and a means for securing the mandrel within the said housing, the said mandrel containing a plurality of longitudinal grooves on its outer periphery which grooves extend at least the length that the outer housing is in contact with the mandrel.

2. A guider tip for holding a plurality of filamentary structures in spaced relationship which comprises a generally cylindrical mandrel, an outer sleeve for said mandrel, an outer housing for said sleeve and a means for securing the mandrel and sleeve within the said housing, the said mandrel containing a plurality of longitudinal grooves on its outer periphery which extends at least the length that the sleeve is in contact with the mandrel and the said sleeve containing a slot which extends the length of the sleeve.

3. A crosshead for extrusion coating a plurality of filamentary structures which comprises an inlet for the filamentary structures, an outlet for the filamentary structures and a plastic supply located between said inlet and said outlet, the said inlet and the said outlet each comprising a generally cylindrical mandrel, an outer sleeve for said mandrel, an outer housing for said sleeve and a means for securing the mandrel and sleeve within the said housing, the said mandrel containing a plurality of longitudinal grooves on its outer periphery which extends the length of the mandrel and the said sleeve containing a slot which extends the length of the sleeve.

4. A crosshead for forming a plurality of filamentary structures embedded within a plastic which comprises an inlet for the filamentary structure, an outlet for the filamentary structure embedded within a plastic and a plastic supply located between said inlet and said outlet, the said outlet comprising one hole extrusion orifice and the said inlet comprising generally cylindrical mandrel, an outer sleeve for said mandrel, an outer housing for said sleeve and a means for securing the mandrel and sleeve within the said housing, the said mandrel containing a plurality of longitudinal grooves on its outer periphery which extends the length of the mandrel and the said sleeve containing a slot which extends the length of the sleeve.

References Cited

UNITED STATES PATENTS

| 1,633,620 | 6/1927 | Alderfer | 18—13 |
| 2,488,576 | 11/1949 | Berggren | 18—13 |
| 2,522,364 | 9/1950 | Grana | 18—13 |
| 2,698,965 | 1/1955 | Radtke | 18—13 |
| 2,902,754 | 9/1959 | Lorenian | 18—13 |
| 3,058,493 | 10/1962 | Muller. | |

WILLIAM J. STEPHENSON, *Primary Examiner.*